(12) United States Patent
Lam et al.

(10) Patent No.: US 6,704,173 B1
(45) Date of Patent: Mar. 9, 2004

(54) METHOD AND SYSTEM FOR PROVIDING ESD PROTECTION USING DIODES AND A GROUNDING STRIP IN A HEAD GIMBAL ASSEMBLY

(75) Inventors: Chung Fai Lam, San Jose, CA (US); Gary Lloyd Crown, Pleasanton, CA (US); Seila Chao Chim, San Jose, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 09/641,025

(22) Filed: Aug. 16, 2000

(51) Int. Cl.⁷ ................................. G11B 5/39
(52) U.S. Cl. ....................................... 360/323
(58) Field of Search ........................... 360/323

(56) References Cited

U.S. PATENT DOCUMENTS

| | | |
|---|---|---|
| 5,614,727 A | 3/1997 | Mauri et al. |
| 5,638,237 A | 6/1997 | Phipps et al. |
| 5,757,590 A | 5/1998 | Phipps et al. |
| 5,757,591 A * | 5/1998 | Carr .......................... 360/323 |
| 5,877,933 A | 3/1999 | Johansen et al. |
| 5,963,415 A | 10/1999 | Johansen |
| 5,988,796 A | 11/1999 | Yamanaka |
| 6,081,409 A * | 6/2000 | Hughbanks ................. 360/323 |
| 6,163,443 A * | 12/2000 | Hatagami .................... 360/323 |
| 6,267,903 B1 * | 7/2001 | Watanuki .................... 360/323 |

* cited by examiner

Primary Examiner—A. J. Heinz
(74) Attorney, Agent, or Firm—Sawyer Law Group LLP (57) ABSTRACT

A method and system for providing a suspension assembly for protecting a magnetoresistive (MR) head from electrostatic discharge damage is disclosed. The MR head includes an MR sensor having a first end and a second end. The method and system include providing a first lead and a second lead and providing an insulating film substantially supporting a first portion of the first lead and a second portion of the second lead. The MR head is coupled with the suspension assembly. The first and second ends of the MR sensor are coupled with the first and second leads, respectively. The method and system include providing a conductive strip coupled with the insulating film. In one aspect, the method and system include providing at least one diode electrically coupling the first lead and the second lead. In another aspect, the method and system also include electrically coupling first lead with the conductive strip. In another aspect, the method and system also include electrically coupling first lead with the conductive strip and electrically coupling the first and second lead. In another aspect, the method and system include electrically coupling first and second leads with the conductive strip. Preferably, electric coupling is provided using at least one diode.

28 Claims, 10 Drawing Sheets

Prior Art

METHOD AND SYSTEM FOR PROVIDING ESD PROTECTION USING DIODES AND A GROUNDING STRIP IN A HEAD GIMBAL ASSEMBLY

FIELD OF THE INVENTION

The present invention relates to magnetoresistive heads and more particularly to a method and system for providing electrostatic discharge protection for magnetoresistive heads, particularly in devices using a flex-on-suspension (FOS) or trace-suspension-assembly (TSA) in a head-gimbal-assembly (HGA).

BACKGROUND OF THE INVENTION

Figure 1:
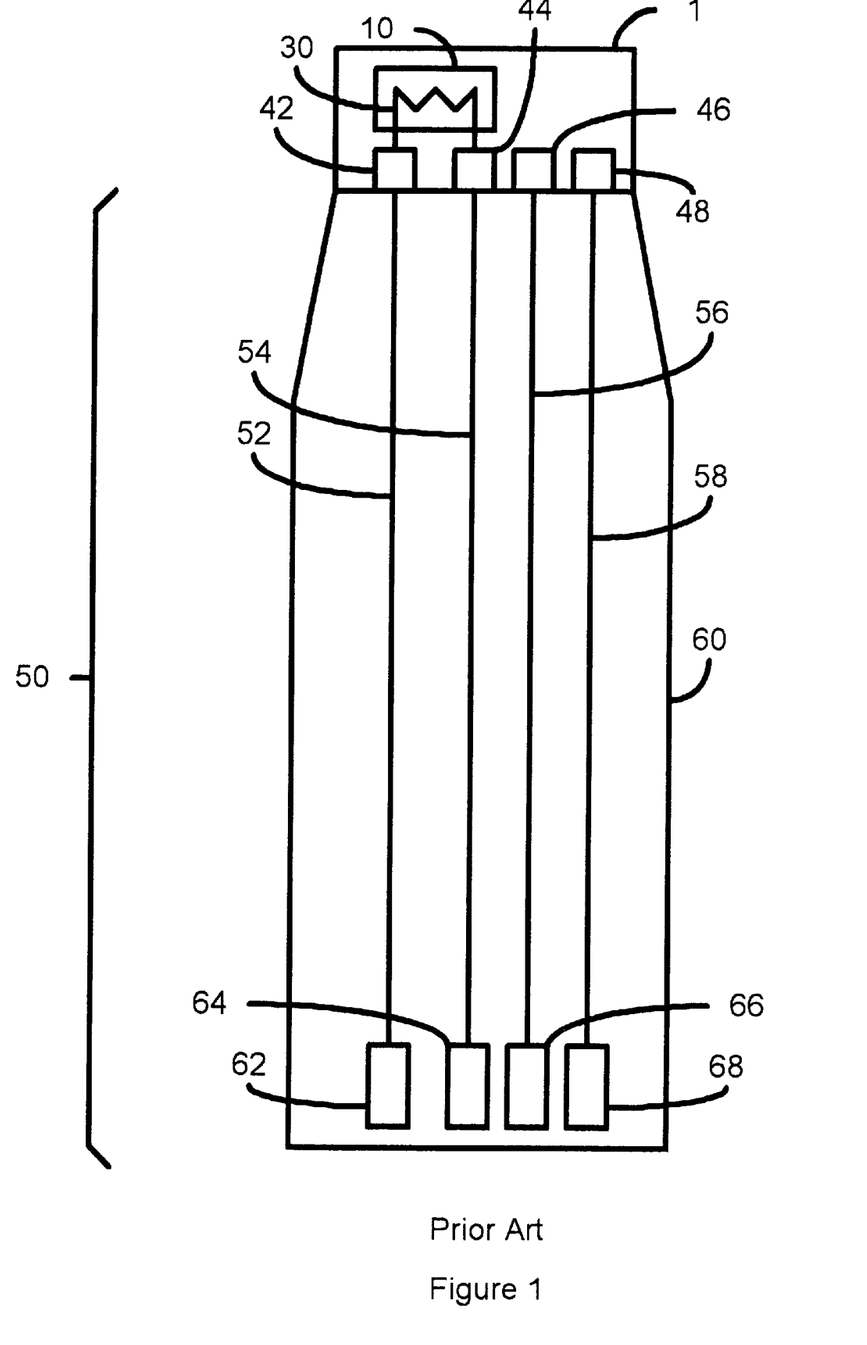
FIG. 1 is a diagram of a conventional suspension assembly.

FIG. 1 is a block diagram of a portion of a suspension assembly used in magnetoresistive (MR) technology. Depicted with the suspension assembly 50 is a slider 1 including an MR head 10 used in reading magnetic recording media. Typically, the slider 1 includes a merged head. Thus, the MR head 10 is part of a merged head that also includes a write head. However, for clarity, only the MR head 10 is shown. The MR head 10 includes an MR sensor 30. Typically, the MR sensor 10 is an anisotropic magnetoresistive (MR) sensor or a giant magnetoresistive (GMR) sensor. The slider 1 also includes pads 42, 44, 46 and 48. Two pads 42 and 44 are used for making electrical contact to the MR sensor 30 from other portions of the suspension assembly 50. The other two pads 46 and 48 may be used in making electrical contact to the write head.

In order to use the MR head 10 in a disk drive, electrical connection is made to the MR sensor 30 via the pads 42 and 44. In some conventional systems, a twisted pair of wires is used to connect to the leads 42 and 44. However, the conventional suspension assembly 50 is typically provided in order to couple the MR sensor 30 to the remaining electronics (not shown).

The conventional suspension assembly 50 may include a flex-on-suspension (FOS) developed by Read-Rite Corporation of Milpitas, Calif., in a trace-suspension-assembly (TSA), in a chip on suspension (COS) or in a bridge-flex-circuit (BFC). Note that the BFC is typically coupled with the MR head 10 through the FOS, TSA or COS. Thus, as used herein a suspension assembly can refer to any combination of a FOS, a TSA, a COS, a BFC or similar structure for making electrical contact to the MR head 10. The conventional suspension assembly 50 has a wireless electrical connection with the MR head 10 that allows for a smaller form factor for the head and head-gimbal-assembly. The conventional suspension assembly 50 is typically significantly longer than the slider 1.

The conventional suspension assembly 50 is typically mechanically coupled with the slider 1 via a metal arm (not shown). The conventional suspension assembly 50 includes a first lead 52, a second lead 54, a third lead 56 and a fourth lead 58. Note, however, that the third lead 56 and fourth lead 58 may be omitted if the slider assembly 1 does not include a write head. The leads are typically surrounded by an insulating film 60. The insulating film 60 is typically made of two layers of polyimide. The film 60 generally surrounds the leads 52, 54, 56 and 58. Thus, in the conventional suspension assembly 50 the leads 52, 54, 56 and 58 are typically sandwiched between two layers of film 60. The conventional suspension assembly 50 also includes four head gimbal assembly (HGA) pads 62, 64, 66 and 68 coupled with the leads 52, 54, 56 and 58, respectively. The leads 52 and 54 are also electrically coupled with the MR sensor 30, preferably through pads 42 and 44. Thus, electrical connection can be made to the MR sensor 30 even when the MR head 10 is sufficiently small for use in present disk drives.

Although the conventional suspension assembly 50 functions, one of ordinary skill in the art will readily realize that the conventional suspension assembly 50 and head 10 are subject to electrostatic discharge (ESD) failure. During fabrication, the MR sensor 30 is often rendered inoperative. In some cases, losses may be as high as ten to twenty percent. It has been determined that these losses may be due to tribo-charging of the film 60 in the suspension assembly 50. As higher density recording media is used, the MR head 10 is built smaller to be capable of reading narrow track signals from high-density recording media. As the MR head 10 is reduced in size, more damage to the MR sensor 30 can be caused by smaller transient currents due to ESD.

For example, during manufacture, electrical contact is often made to a portion of the conventional suspension assembly 50, such as the HGA pads 62 or 64. When a charged metal fixture touches the pad 62 or 64, the charge can be transferred to the HGA pad 62 or 64. The charge on the HGA pad 62 or 64 could cause a large transient current to flow through the MR sensor 30 as the charge is discharged. Charge could be similarly transferred to the leads 52 and 54, resulting in a transient current which flows through the MR sensor 30. The transient current can easily destroy the MR sensor 30. Thus, the MR sensor 30 may be damaged or destroyed due to ESD.

Many conventional systems have been developed for protecting the MR head 10 from damage due to ESD. Some conventional methods connect a very low resistance conductor between the leads 52 and 54. The conductor typically has a resistance of only a few ohms or less. In other words, the leads 52 and 54 are shorted. As a result, the transient current can be prevented. Other conventional methods connect a very high resistance shunt between the leads 52 and 54, or between one of the leads 52 and 54 and ground. The high resistance shunt is typically on the order of $10^6$ Ohms. The high resistance shunt allows any charge accumulated on the conventional suspension assembly 50 to be slowly dissipated. Thus, the MR sensor 30 may be preserved.

Although the very high resistance and very low resistance shunts can function, one of ordinary skill in the art will readily recognize that such shunts are typically temporary and, therefore, removable. As a result, the protection provided from ESD damage is also temporary. For example, prior to contacting a shunt with the HGA pads 62 and 64, the MR sensor 30 is not protected. Thus, the MR head 10 may still be subject to failure due to ESD induced damage during manufacture.

Accordingly, what is needed is a system and method for providing ESD protection for MR heads during fabrication. The present invention addresses such a need.

SUMMARY OF THE INVENTION

The present invention provides a method and system for providing a suspension assembly which includes a mechanism for protecting a magnetoresistive (MR) head from electrostatic discharge damage. The MR head includes an MR sensor having a first end and a second end. The method and system comprise providing a first lead and a second lead. The method and system also comprise providing an insulating film that substantially supports a first portion of the first lead and a second portion of the second lead. The MR head is coupled with the suspension assembly. The first and second ends of the MR sensor are coupled with the first and second leads, respectively. The method and system also comprise providing a conductive strip coupled with the insulating film. In one aspect, the method and system comprise providing at least one diode electrically coupling the first lead and the second lead. In another aspect, the method and system also comprise electrically coupling first lead with the conductive strip. In another aspect, the method and system also comprise electrically coupling first lead with the conductive strip and electrically coupling the first and second lead. In another aspect, the method and system comprise electrically coupling first and second leads with the conductive strip. Preferably, electric coupling is provided using at least one diode.

According to the system and method disclosed herein, the present invention provides greater robustness against damage due to electrostatic discharge.

DETAILED DESCRIPTION OF THE INVENTION

The present invention relates to an improvement in magnetoresistive head technology. Thus, the present invention can be used with anisotropic magnetoresistance (AMR) sensors as well as giant magnetoresistance (GMR) sensors. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown, but is to be accorded the widest scope consistent with the principles and features described herein.

Conventional magnetoresistive (MR) heads are finding increased usage as read heads, typically as part of a merged head that includes an MR head for reading and an inductive write head for writing. The MR heads typically include an AMR sensor or, for higher density applications, a giant magnetoresistive GMR sensor. As technology moves to higher densities, the MR sensors in the MR heads are made smaller and, therefore, are more fragile. In particular, transient currents due to electrostatic discharge (ESD) can, damage or destroy an MR sensor, rendering the MR head inoperable.

Conventional mechanisms for reducing ESD induced damage including providing a very low resistance shunt or a very high resistance shunt. The very low resistance shunt is typically a few ohms or less. The very high resistance shunt is typically at least $10^5$ ohms or greater. Although these conventional shunts can protect the MR sensor from damage, one of ordinary skill in the art will readily realize that the shunts are typically temporary. Thus, ESD induced damage may still occur before the shunt is provided or after the shunt is removed. Consequently, there is still a significant number of MR heads which fail because of ESD damage suffered during manufacture.

The present invention provides a method and system for providing a suspension assembly for protecting a magnetoresistive (MR) head from electrostatic discharge damage. The MR head includes an MR sensor having a first end and a second end. The method and system comprise providing a suspension assembly having a first lead and a second lead and providing an insulating film substantially supporting a first portion of the first lead and a second portion of the second lead. The MR head is coupled with the suspension assembly. The first and second ends of the MR sensor are coupled with the first and second leads, respectively. The method and system comprise providing a conductive strip coupled with the insulating film. In one aspect, the method and system comprise providing at least one diode electrically coupling the first lead and the second lead. In another aspect, the method and system also comprise electrically coupling first lead with the conductive strip. In another aspect, the method and system also comprise electrically coupling first lead with the conductive strip and electrically coupling the first and second lead. In another aspect, the method and system comprise electrically coupling first and second leads with the conductive strip. Preferably, electric coupling is provided using at least one diode.

The present invention will be described in terms of a particular suspension assembly and particular heads. However, one of ordinary skill in the art will readily recognize that this method and system will operate effectively for other suspension assemblies and other heads. The present invention will also be described in the context of particular components, such as certain diodes having certain threshold voltages. However, one of ordinary skill in the art will readily realize that the present invention operates effectively for other components, including other diodes having different threshold voltages. The present invention will also be described in terms of different configurations for providing ESD protection, such as the use of conductive strip(s), the use of diode(s) coupling leads, and the use of diode(s) coupling lead(s) and the conductive strip(s). However, one of ordinary skill in the art will readily realize that the present invention is consistent with any combination of portions of the above configurations.

Figure 2A:
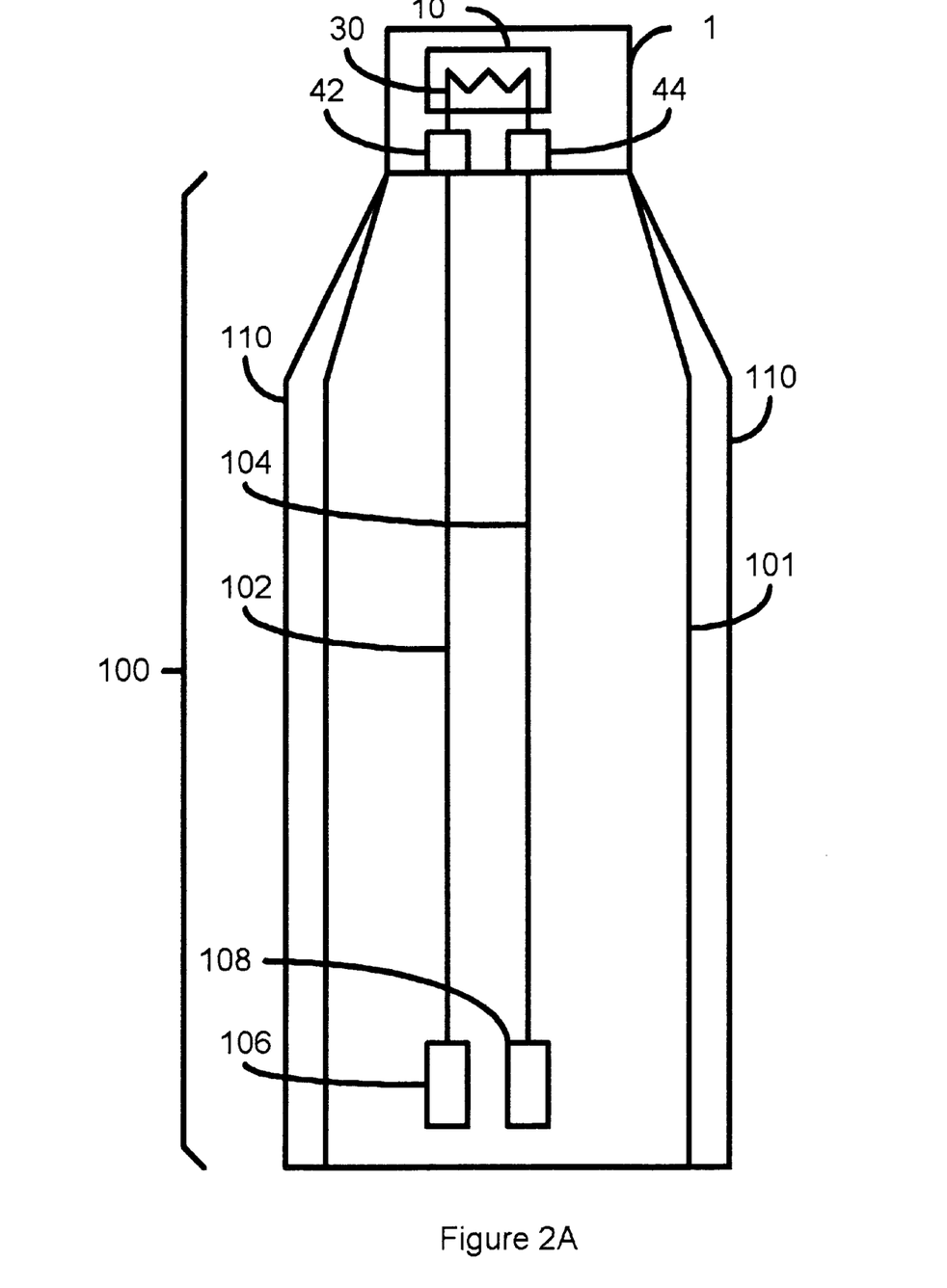
FIG. 2A is a diagram of one version of a first embodiment of a suspension assembly in accordance with the present invention.
Figure 2B:
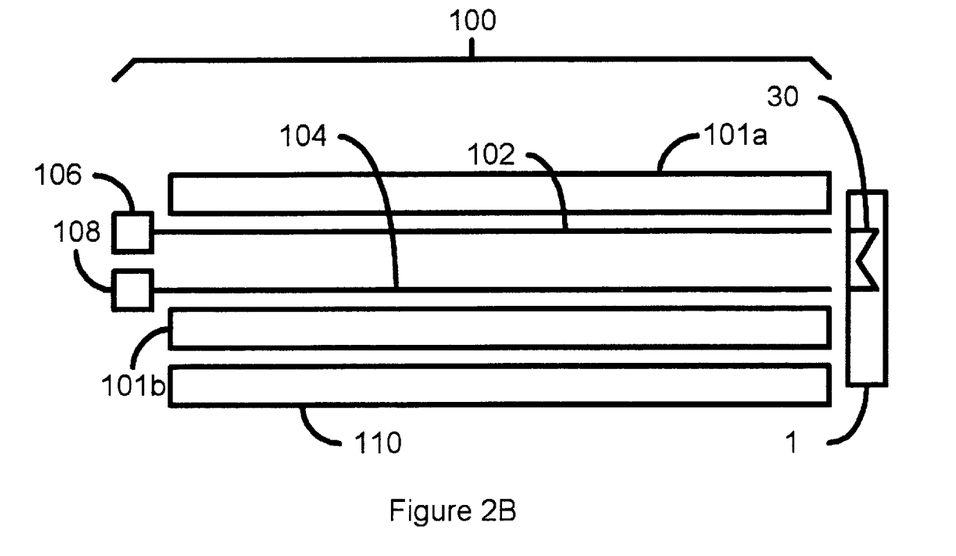
FIG. 2B is an exploded side view of one version of a first embodiment of a suspension assembly in accordance with the present invention.

To more particularly illustrate the method and system in accordance with the present invention, refer now to FIGS. 2A and 2B. FIG. 2A depicts one embodiment of a suspension assembly 100 in accordance with the present invention, as well as a slider 1 including an MR head 10 which has an MR sensor 30. FIG. 2B also depicts the suspension assembly 100 and slider 1. FIG. 2B is an exploded side view of the suspension assembly 100. Referring to FIGS. 2A and 2B, the MR sensor 30 is generally a GMR sensor. Furthermore, the slider 1 also preferably includes a write head and is, therefore, a merged head, only the MR head 10 is shown for the purposes of clarity. Furthermore, although the MR sensor 30 is depicted as the only component of the MR head 10, the MR head 10 typically includes other components. Also depicted on the MR head 10 are pads 42 and 44. For clarity, only the pads 42 and 44 connected with the MR sensor 30 are depicted in FIG. 2A.

The suspension assembly 100 is preferably a FOS, TSA, BFC or similar suspension assembly. The suspension assembly 100 includes an insulating layer 101 which holds leads 102 and 104. For clarity, only leads 102 and 104 coupled to pads 42 and 44 and, therefore, to the MR sensor 30 are depicted. Also on the insulating layer 101 are head gimbal assembly (HGA) pads 106 and 108. The insulating layer 101 is preferably a polyimide. The insulating layer 101 preferably surrounds the leads 102 and 104. In a preferred embodiment, the insulating layer 101 is composed of two sheets of insulation 101a and 101b, between which the leads 102 and 104 are sandwiched. However, nothing prevents the use of an assembly in which the leads 102 and 104 are not sandwiched between layers of insulation 101a and 101b.

The suspension assembly 100 also includes a conductive strip 110. For clarity, the conductive strip 110 is depicted as wider than the insulating layer 101 in FIG. 2A. However, the conductive strip 110 is preferably the same width as or thinner than the insulating layer 101. However, the conductive strip 110 should be relatively wide compared with the leads. The conductive strip 110 is preferably a metallic strip. The conductive strip 110 is mechanically and electrically coupled with the insulating layer 101. In FIG. 2B, the conductive strip 110 is depicted as at the bottom of the suspension assembly 100. However, the conductive strip 110 could be at the top of the suspension assembly 100. In addition, the conductive strip 110 is preferably thin and flexible. This allows the conductive strip 110 to be bent along with the insulating layer 101.

The conductive strip 110 acts as a ground plane for the suspension assembly 110 and the MR head 10. The MR head 10 and, therefore, the MR sensor 30 can be protected from ESD induced damage. In particular, the conductive strip 110 acts as a plate of a capacitor. Consequently, when a tribocharge resides on the insulating layer 101 or other portion of the suspension assembly 100, an opposite charge may be induced on the conductive strip 110. In particular, an opposite charge in proximity to the tribo-charge will be induced in the conductive strip 110. The conductive strip will also have a free charge that is the same sign as the original tribo-charge. Thus, the remainder of the suspension assembly 100 is charged to a significantly lower voltage. In other words, the conductive strip 110 can at least partially neutralize a tribo-charge on the suspension assembly 100 because of the induced, opposite charge. As a result, less transient current will tend to flow through the MR sensor 30 when ESD occurs. Furthermore, the conductive strip 110 can be grounded. As a result, the free charge on the conductive strip may flow to ground. The suspension assembly 100 as a whole (including the conductive strip 110) can then be considered to be approximately neutral. This dissipation of the charge is accomplished without the flow of transient current through the MR sensor. Thus, ESD induced damage to the MR head 10 can be reduced or eliminated. This can be achieved without directly electrically connecting the conductive strip 110 to the MR sensor 30.

The conductive strip 110 can also help to protect the MR sensor from pickup of stray electromagnetic (EM) waves. Without the conductive strip 110, the leads 102 and 104 may act as antennae, picking up EM waves. These EM waves can thus cause transient currents through the leads 102 and 104 as well as through the MR sensor 30, generating noise. The conductive strip 110 shields the leads 102 and 104 from the EM waves and thus reduces noise from pickup.

Figure 2C:
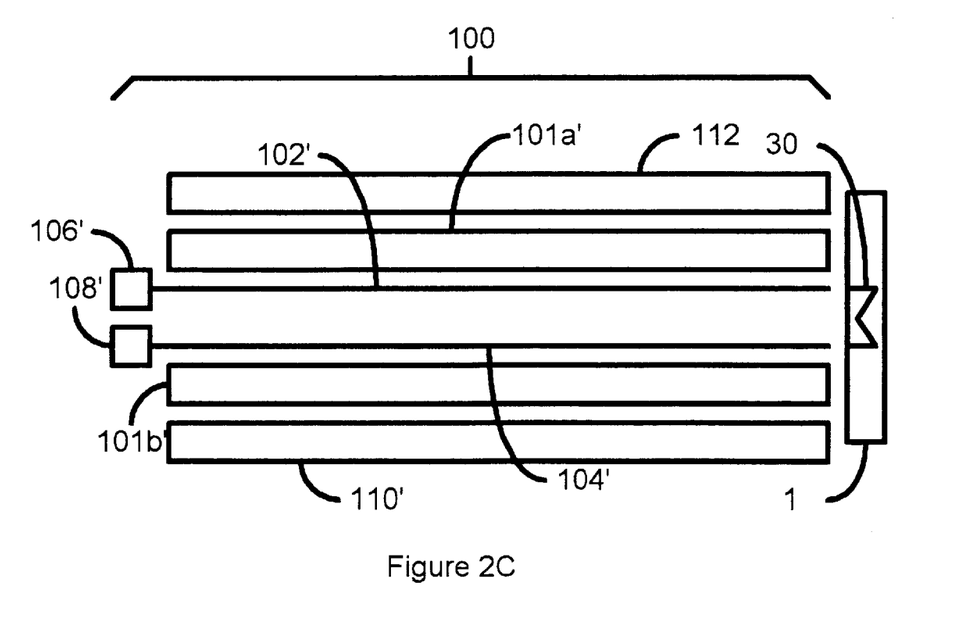
FIG. 2C is an exploded side view of another version of a first embodiment of a suspension assembly in accordance with the present invention.

FIG. 2C is an exploded side view of diagram of another version of a first embodiment of a suspension assembly 100' in accordance with the present invention. The suspension assembly 100' is substantially the same as the suspension assembly 100 depicted in FIGS. 2A and 2B. Consequently, many of the components of the suspension assembly 100' are labeled similarly to components of the suspension assembly 100. For example, the insulating layers of the suspension assembly 100' are labeled 101a' and 101b'. The suspension assembly 100', however, includes two conductive strips 110' and 112. The conductive strips 110' and 112 are mechanically and electrically coupled to the insulating layers 101b' and 101a', respectively. The conductive strips 110' and 112 are preferably much wider than the leads 102' and 104' and thin and flexible. Each of the conductive strips 110' and 112 provides the benefits discussed above with respect to the conductive strip 110 and the suspension assembly 100. Thus, each of the conductive strips 110' and 112 can store charge, thereby reducing ESD-induced damage from tribo-charging of the suspension assembly 100'. Each of the conductive strips 110' and 112 also shields the leads 102' and 104' from EM waves. Because two conductive strips 110' and 112 are present in the suspension assembly 100', the benefits discussed above may be increased. For example, the conductive strips 110' and 112 may be capable of storing greater charge than a single conductive strip, such as the conductive strip 110 depicted in FIGS. 2A and 2B. Referring back to FIG. 2C, the conductive strips 110' and 112 may thus provide greater protection against ESD induced damage of the MR sensor 30. For similar reasons, the use of multiple conductive strips 110' and 112 may provide improved reduction of noise due to pickup of EM waves.

Figure 3A:
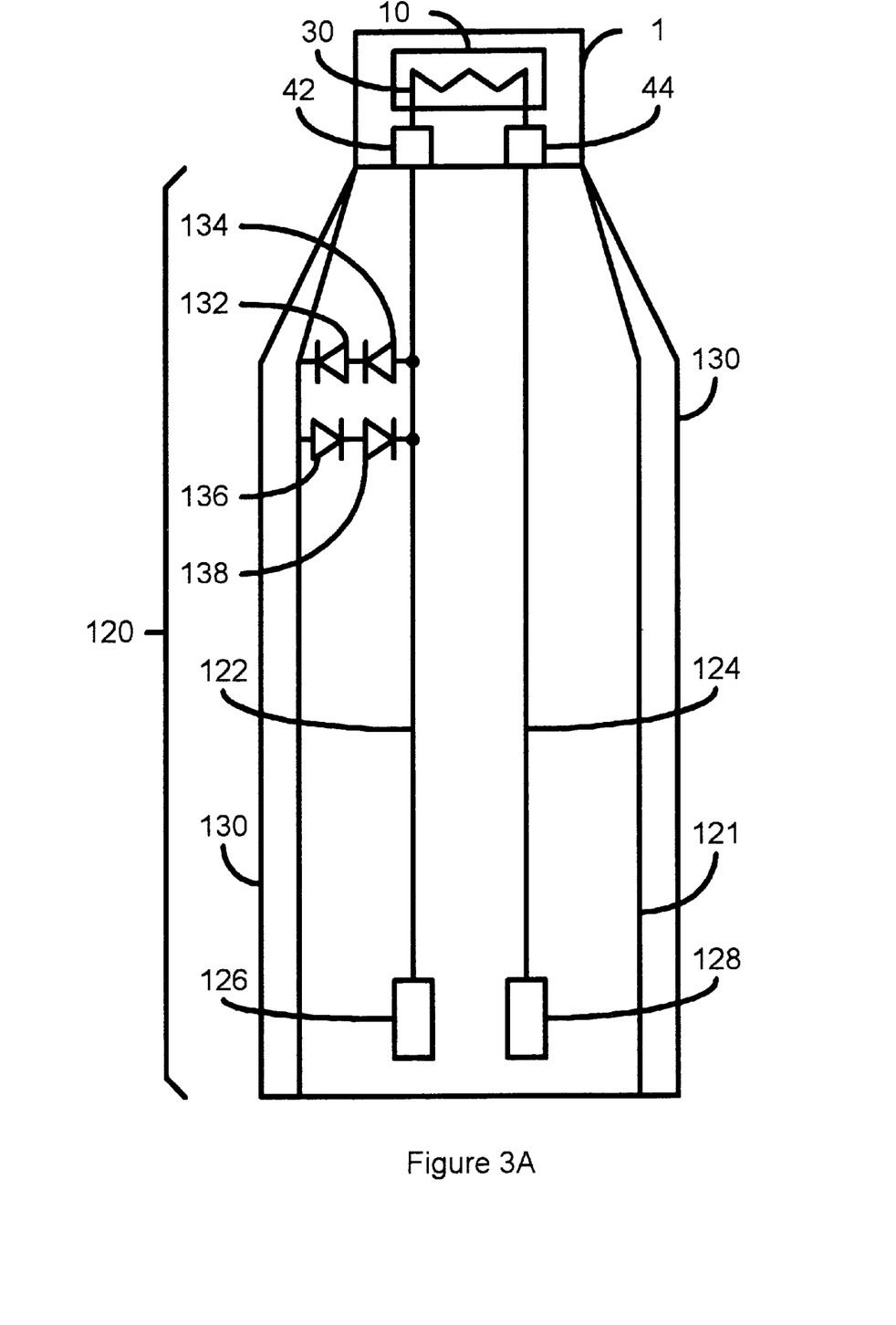
FIG. 3A is a diagram of one version of the second embodiment of a suspension assembly in accordance with the present invention.
Figure 3B:
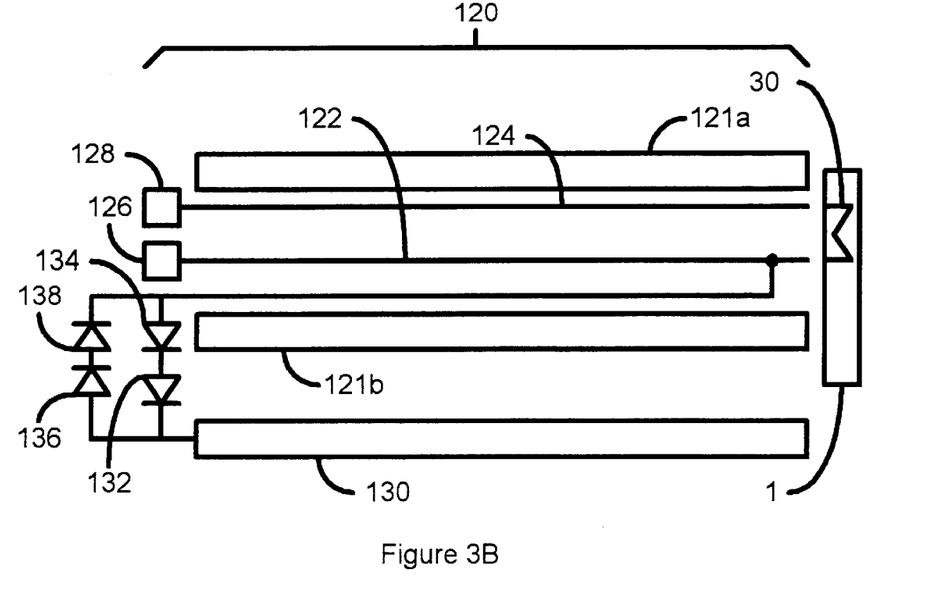
FIG. 3B is an exploded side view of one version of the second embodiment of a suspension assembly in accordance with the present invention.

FIGS. 3A and 3B depict a second embodiment of a suspension assembly 120 in accordance with the present invention. FIG. 3A is a diagram of one version of the second embodiment of a suspension assembly 120 in accordance with the present invention. FIG. 3B is an exploded side view the suspension assembly 120 in accordance with the present invention. Referring to FIGS. 3A and 3B, in addition to the suspension assembly 120, the slider 1 including the MR head 10 is depicted. The slider 1 also preferably includes a write head and is, therefore, a merged head. However, only the MR head 10 is shown for the purposes of clarity. Furthermore, although the MR sensor 30 is depicted as the only component of the MR head 10, the MR head 10 typically includes other components. Also depicted on the MR head 10 are pads 42 and 44. For clarity, only the pads 42 and 44 connected with the MR sensor 30 are depicted in FIG. 3A.

The suspension assembly 120 is preferably a FOS, TSA, BFC or similar suspension assembly. The suspension assembly 120 includes an insulating layer 121 which holds leads 122 and 124. For clarity, only the leads 122 and 124 for the MR sensor 30 are depicted. Also on the insulating layer 121 are HGA pads 126 and 128. The insulating layer 121 is preferably a polyimide. The insulating layer 121 preferably surrounds the leads 122 and 124. In a preferred embodiment, the insulating layer 121 is composed of two sheets of insulation 121*a* and 121*b*, between which the leads 122 and 124 are sandwiched. However, nothing prevents the use of an assembly in which the leads 122 and 124 are not sandwiched between layers of insulation 121*a* and 121*b*.

The suspension assembly 120 also includes a conductive strip 130. For clarity, the conductive strip 130 is depicted as wider than the insulating layer 121 in FIG. 3A. However, the conductive strip 130 is preferably the same width as or thinner than the insulating layer 121. However, the conductive strip 130 should be relatively wide compared with the leads. In addition, the conductive strip 130 is preferably thin and flexible. This allows the conductive strip 130 to be bent along with the insulating layer 121. The conductive strip 130 is preferably a metallic strip. The conductive strip 130 is mechanically and electrically coupled with the insulating layer 121. In FIG. 3B, the conductive strip 130 is depicted as at the bottom of the suspension assembly 120. However, the conductive strip 130 could be at the top of the suspension assembly 120.

The conductive strip 130 acts as a grounding plane for the suspension assembly 120 and the MR head 10. Thus, the suspension assembly 120 has many of the same benefits as the suspension assembly 100 depicted in FIG. 2A. In particular, ESD induced damage can be reduced or eliminated and noise due to pickup of EM waves can be substantially mitigated or eliminate.

Referring back to FIGS. 3A and 3B, the suspension assembly 120 also includes diodes 132, 134, 136 and 138 which couple the lead 122 with the conductive strip 130. In a preferred embodiment, multiple diodes 132, 134, 136 and 138 are used and allow current to flow in either direction, from the conductive strip 130 to the lead 102 or vice versa. In a preferred embodiment, each of the diodes 132, 134, 136 and 138 is a silicon diode which has a threshold voltage of approximately 0.7 volts. However, in another embodiment the diodes may be of different types. Thus, the threshold voltages of the diodes 132, 134, 136 and 138 can be different. The number and total voltage drop between the conductive strip 130 and the lead 102 is chosen to provide protection against ESD induced damage without adversely impacting performance of the MR sensor 10 during operation.

The diodes 132, 134, 136 and 138 are preferably very small, allowing the diodes 132, 134, 136 and 138 to be easily incorporated into the suspension assembly 120. In addition, the diodes preferably have a very fast response. In a preferred embodiment, the capacitance of each diode 132, 134, 136 and 138 is approximately 0.3 pF, allowing for a time to turn on the diode 132, 134, 136 or 138 to be approximately 0.6 pico-seconds. In a preferred embodiment, the resistance of each diode is nominally two ohms. For example, the diodes 132, 134, 136 and 138 may be fast silicon switching diodes or Schottky-barrier diodes. In a preferred embodiment, the diodes 132, 134, 136 and 138 are also placed in proximity to the MR sensor 10. Thus, the diodes 132, 134, 136 and 138 are preferably placed very close to the MR sensor 30, and relatively far from the HGA pads 126 and 128.

The diodes 132, 134, 136 and 138 each act as a clamp having a voltage equal to the threshold voltage (preferably approximately 0.7 volts each). In addition, the conductive strip 130 acts as a ground plane. Thus, the conductive strip 130 acts as a local ground and, when actually grounded, a global ground. As discussed above, the diodes 132 and 134 and the diodes 136 and 138 also electrically couple the lead 122 and (local or global) ground provided by the conductive strip 130. As a result, current that would otherwise flow through the MR sensor 30 may flow through the diodes 132 and 134 or through the diodes 136 and 138. The current will flow through the diodes 132 and 134 or the diodes 136 and 138 if the voltage between the lead 122 and the conductive strip 130 is greater than the sum of the threshold voltages of the diodes 132 and 134 or the sum of the threshold voltages of the diodes 136 and 138, respectively. Consequently, transient currents through the MR sensor 30 can be reduced or eliminated. These transient currents may be due to tribo-charging of the lead 122. Thus, the MR sensor 30 can be protected from ESD induced damage.

For example, the pad 126 may be touched during fabrication of the suspension assembly 120, inducing a large charge on the lead 122. Instead of dissipating this charge through the MR sensor 30, at least a portion of the charge can dissipated by the flow of current between the lead 122 and the conductive strip 130 when the voltage difference between the lead 122 and the conductive strip 130 due to the charge on the lead 122 is at least the sum of the threshold voltages of the diodes 132 and 134 or the sum of the threshold voltages of the diodes 136 and 138. The actual path of the current, through diodes 132 and 134 or through diodes 136 and 138 depends upon the sign of the charge on the lead 122. Thus, a voltage of greater than or equal to sum of the threshold voltages of the diodes 132 and 134 or the diodes 136 and 138 (e.g. 1.4 volts if each diode 132, 134, 136 and 138 has a threshold voltage of 0.7 volts) and that may be due to a tribo-charge can be dissipated through the diodes 132 and 134 or the diodes 136 and 138, respectively. Consequently, the MR sensor 30 can be protected from damage due to transient currents.

Figure 3C:
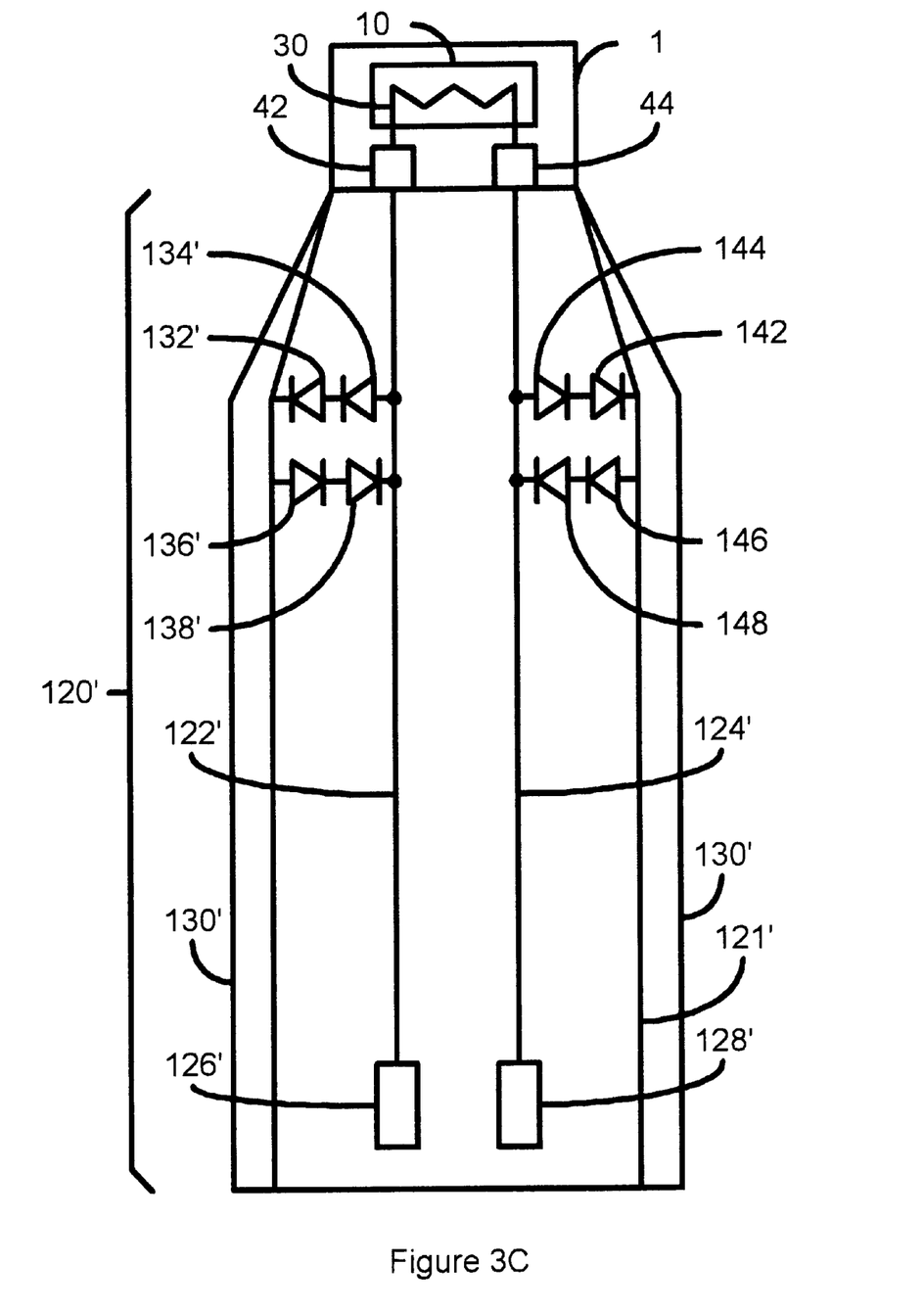
FIG. 3C is a diagram of another version of the second embodiment of a suspension assembly in accordance with the present invention.

FIG. 3C is a diagram of another version of the second embodiment of a suspension assembly 120' in accordance with the present invention. Many of the components of the suspension assembly 120' are the same as the suspension assembly 120. Consequently, many of the components of the suspension assembly 120' are labeled similarly to corresponding components of the suspension assembly 120. For example, the suspension assembly 120' includes diodes 132', 134', 136' and 138' that correspond to the diodes 132, 134, 136 and 138 of the suspension assembly 120. Thus, the suspension assembly. 120' has many of the same benefits as the suspension assembly 120. Thus, the conductive strip 130' of suspension assembly 120' provides protection against ESD induced damage and pickup of EM waves. The diodes 132', 134', 136' and 138' also protect against ESD induced damage by allowing current to flow between the lead 122' and the conductive strip 130'.

The suspension assembly 120' also includes diodes 142, 144, 146 and 148, which can electrically couple the lead 124' to the conductive strip 130'. Note that although only one conductive strip 130' is shown, multiple conductive strips could be used. In addition, the diodes 132', 134', 136' and 138' could be coupled to a different conductive strip than the diodes 142, 144, 146 and 148. The diodes 142, 144, 146 and 148 function similarly to the diodes 132', 134', 136' and 138'. The diodes 142, 144, 146 and 148 can electrically couple the lead 124' to the conductive strip 130'. The diodes 132', 134', 136', 138', 142, 144, 146 and 148 preferably have the same characteristics as the diodes 130, 132, 134 and 136 of FIGS.

3A and 3B. Referring back to FIG. 3C, the diodes 132', 134', 136' and 138' and the diodes 142, 144, 146 and 148 are preferably coupled to the leads 122' and 124', respectively, at locations that are close to the MR sensor 30.

The diodes 132', 134', 136' and 138' and the diodes 142, 144, 146 and 148 each act as a clamp having a voltage equal to the threshold voltage (preferably approximately 0.7 volts each). In addition, the conductive strip 130' acts as a local ground and, when actually grounded, a global ground. The diodes 132' and 134' and the diodes 136' and 138' also electrically couple the lead 122' and (local or global) ground. Similarly, the diodes 142 and 144 and the diodes 146 and 148 can electrically couple the lead 124' and (local or global) ground. As a result, current that would otherwise flow through the MR sensor 30 may flow through the diodes 132' and 134' or through the diodes 136' and 138'. Similarly, current that would otherwise flow through the MR sensor 30 may flow through the diodes 142 and 144 or through the diodes 146 and 148. The current will flow through the diodes 132' and 134', the diodes 136' and 138', the diodes 142' and 144' and the diodes 146 and 148 if the voltage between the lead 122' and the conductive strip 130' and the lead 124' and the conductive strip 130', respectively, is greater than the sum of the threshold voltages of the diodes 132' and 134', the sum of the threshold voltages 136' and 138', the sum of the threshold voltages of the diodes 142 and 144 and the sum of the threshold voltages of the diodes 146 and 148, respectively. Consequently, transient currents through the MR sensor 30 can be reduced or eliminated. These transient currents may be due to tribo-charging of the lead 122' or the lead 124'. Thus, the MR sensor 30 can be protected from ESD induced damage.

For example, the pad 126' or 128' may be touched during fabrication of the suspension assembly 120', inducing a large charge on the lead 122' or the lead 124', respectively. Instead of dissipating this charge through the MR sensor 30, at least a portion of the charge can dissipated by the flow of current between the lead 122' and the conductive strip 130' or the flow of current between the lead 124' and the conductive strip 130'. Current can flow when the voltage difference between the lead 122' and the conductive strip 130' due to the charge on the lead 122' is at least the sum of the threshold voltages of the diodes 132' and 134' or the sum of the threshold voltages of the diodes 136' and 138'. Similarly, current can flow when the voltage difference between the lead 124' and the conductive strip 130' due to the charge on the lead 124' is at least the sum of the threshold voltages of the diodes 142 and 144 or the sum of the threshold voltages of the diodes 146 and 148. The actual path of the current, through diodes 132' and 134', through diodes 136' and 138', through diodes 142 and 144 or through diodes 146 and 148, depends upon the sign of the charge on the lead 122' or 124', respectively. Thus, a voltage of greater than or equal to sum of the threshold voltages of the diodes 132' and 134', the diodes 136' and 138', the diodes 142 and 144, or the diodes 146 and 148 (e.g. 1.4 volts if each diode 132', 134', 136', 138', 142, 144, 146 and 148 has a threshold voltage of 0.7 volts) and that may be due to a tribo-charge can be dissipated through the diodes 132' and 134', the diodes 136' and 138', the diodes 142 and 144 or the diodes 146 and 148, respectively. Consequently, the MR sensor 30 can be protected from damage due to transient currents.

Figure 4A:
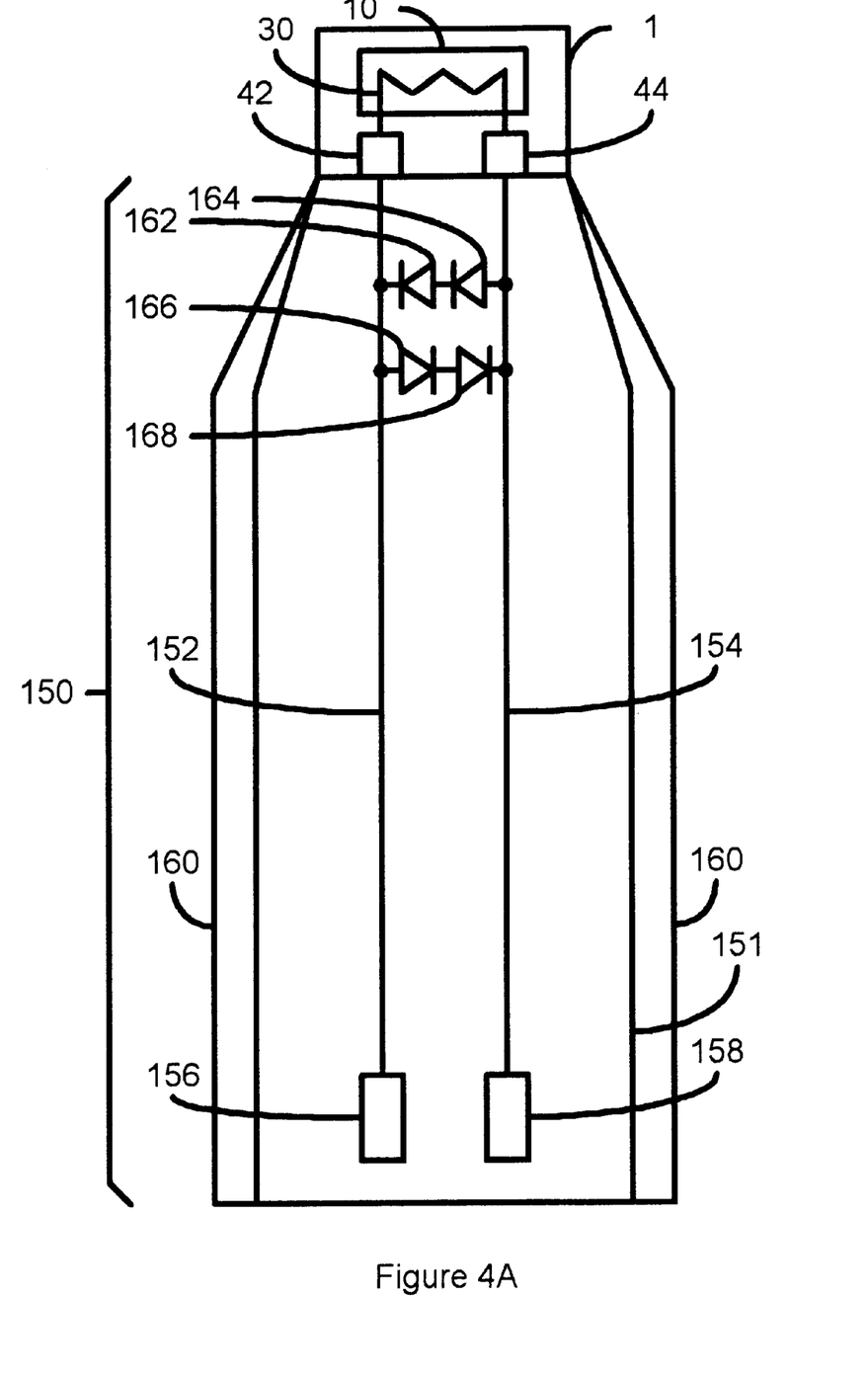
FIG. 4A is a diagram of one version of the third embodiment of a suspension assembly in accordance with the present invention.

FIG. 4A is a diagram a version of the third embodiment of a suspension assembly 150 in accordance with the present invention. In addition to the suspension assembly 150, the slider 1 including the MR head 10 is depicted in FIG. 4A. Furthermore, the slider 1 also preferably includes a write head and is, therefore, a merged head, only the MR head 10 is shown for the purposes of clarity. Furthermore, although the MR sensor 30 is depicted as the only component of the MR head 10, the MR head 10 typically includes other components. Also depicted on the MR head 10 are pads 42 and 44. For clarity, only the pads 42 and 44 connected with the MR sensor 30 are depicted in FIG. 4A.

The suspension assembly 150 is preferably a FOS, TSA, BFC or similar suspension assembly. The suspension assembly 150 includes an insulating layer 151 which holds leads 152 and 154. For clarity, only the leads 152 and 154 for the MR sensor 30 are depicted. Also on the insulating layer 151 are HGA pads 156 and 158. The insulating layer 151 is preferably a polyimide. The insulating layer 151 preferably surrounds the leads 152 and 154. In a preferred embodiment, the insulating layer 151 is composed of two sheets of insulation, between which the leads 152 and 154 are sandwiched. However, nothing prevents the use of an assembly in which the leads 152 and 154 are not sandwiched between insulating layers.

The suspension assembly 150 also includes a conductive strip 160. However, in an alternate embodiment, the conductive strip 150 may be omitted, for example to reduce the mass of the suspension assembly 150. For clarity, the conductive strip 160 is depicted as wider than the insulating layer 161 in FIG. 4A. However, the conductive strip 160 is preferably the same width as or thinner than the insulating layer 151. However, the conductive strip 160 should be relatively wide compared with the leads. In addition, the conductive strip 160 is preferably thin and flexible. This allows the conductive strip 160 to be bent along with the insulating layer 151. The conductive strip 160 is preferably a metallic strip. The conductive strip 160 is mechanically and electrically coupled with the insulating layer 151.

The conductive strip 160 acts as a grounding plane for the suspension assembly 150 and the MR head 10. Thus, the suspension assembly 150 has many of the same benefits as the suspension assembly 100 depicted in FIG. 2A. In particular, ESD induced damage can be reduced or eliminated and noise due to pickup of EM waves can be substantially mitigated or eliminated by the presence of the conductive strip 160.

Referring back to FIG. 4A, the suspension assembly 150 also includes diodes 162, 164, 166 and 168 which couple the leads 152 and 154. In a preferred embodiment, multiple diodes 162, 164, 166 and 168 are used and allow current to flow in either direction, from the lead 152 to the lead 154 or vice versa. In a preferred embodiment, each of the diodes 162, 164, 166 and 168 has a threshold voltage of approximately 0.7 volts. However, in another embodiment the threshold voltage of the diodes 162, 164, 166 and 168 can be different. The number and total voltage drop between the leads 152 and 154 is chosen to provide protection against ESD induced damage without adversely impacting performance of the MR sensor 10 during operation.

The diodes 162, 164, 166 and 168 are preferably very small, allowing the diodes 162, 164, 166 and 168 to be easily incorporated into the suspension assembly 150. In addition, the diodes preferably have a very fast response. In a preferred embodiment, the capacitance of each diode 162, 164, 166 and 168 is approximately 0.3 pF, allowing for a time to turn on the diode 162, 164, 166 or 168 to be approximately 0.6 pico-seconds. In a preferred embodiment, the resistance of each diode is nominally two ohms. For example, the diodes 162, 164, 166 and 168 may be fast silicon switching diodes or Schottky-barrier diodes. In a preferred embodiment, the diodes 162, 164, 166 and 168 are also placed in proximity to the MR sensor 10. Thus, the diodes 162, 164, 166 and 168 are preferably placed very close to the slider 1, and relatively far from the HGA pads 156 and 158. Thus, the diodes 162, 164, 166 and 168 are preferably coupled to the leads 152 and 154 at a location that is close to the MR sensor 30.

The diodes 162, 164, 166 and 168 each act as a clamp having a voltage equal to the threshold voltage (preferably approximately 0.7 volts each). The diodes 162 and 164 and the diodes 166 and 168 also electrically couple the lead 152 and the lead 154. As a result, current that would otherwise flow through the MR sensor 30 may flow through the diodes 162 and 164 or through the diodes 166 and 168. The current will flow through the diodes 162 and 164 or the diodes 166 and 168 if the voltage between the lead 152 and the lead 154 is greater than the sum of the threshold voltages of the diodes 162 and 164 or the sum of the threshold voltages of the diodes 166 and 168, respectively.

The transient currents can flow between the leads 152 and 154, through the diode 162 and 164 or the diodes 166 and 168, allowing a charge on the leads 152 and 154 to dissipate. Each of the diodes 162, 164, 166 and 168 preferably has a resistance of approximately a few ohms. The flow of current through the diodes 162, 164, 166 and 168 can dissipate a charge on the leads 152 and 154. Furthermore, since the MR sensor 30 typically has a much higher resistance than the diodes 162, 164, 166 and 168, on the order of approximately forty ohms, little or no transient current flows through the MR sensor 30. Consequently, transient currents through the MR sensor 30 can be reduced or eliminated. These transient currents may be due to tribo-charging of the lead 152 or the lead 154. Transient currents can, therefore, flow through the leads 152 and 154 and dissipate a charge without a large current passing through the MR sensor 30. Thus, the MR sensor 30 can be protected from ESD induced damage.

For example, the pad 156 or 158 may be touched during fabrication of the suspension assembly 150, inducing a large charge on the lead 152 or 154, respectively. Instead of dissipating this charge through the MR sensor 30, at least a portion of the charge can dissipated by the flow of current between the leads 152 and 154 when the voltage difference between the leads 152 and 154 due to the charge on the lead 152 or 154 is at least the sum of the threshold voltages of the diodes 162 and 164 or the sum of the threshold voltages of the diodes 166 and 168. The actual path of the current, through diodes 162 and 164 or through diodes 166 and 168 depends upon the sign of the charge on the lead 152 or 154. Thus, a voltage of greater than or equal to sum of the threshold voltages of the diodes 162 and 164 or the diodes 166 and 168 (e.g. 1.4 volts if each diode 162, 164, 166 and 168 has a threshold voltage of 0.7 volts) and that may be due to a tribo-charge can be dissipated through the diodes 162 and 164 or the diodes 166 and 168, respectively. In addition, because the resistance of the diodes 162, 164, 166 and 168 is preferably significantly less than that of the MR sensor 30, little of the transient current flows through the MR sensor 30 as the tribo-charge is dissipated. Consequently, the MR sensor 30 can be protected from damage due to transient currents.

Figure 4B:
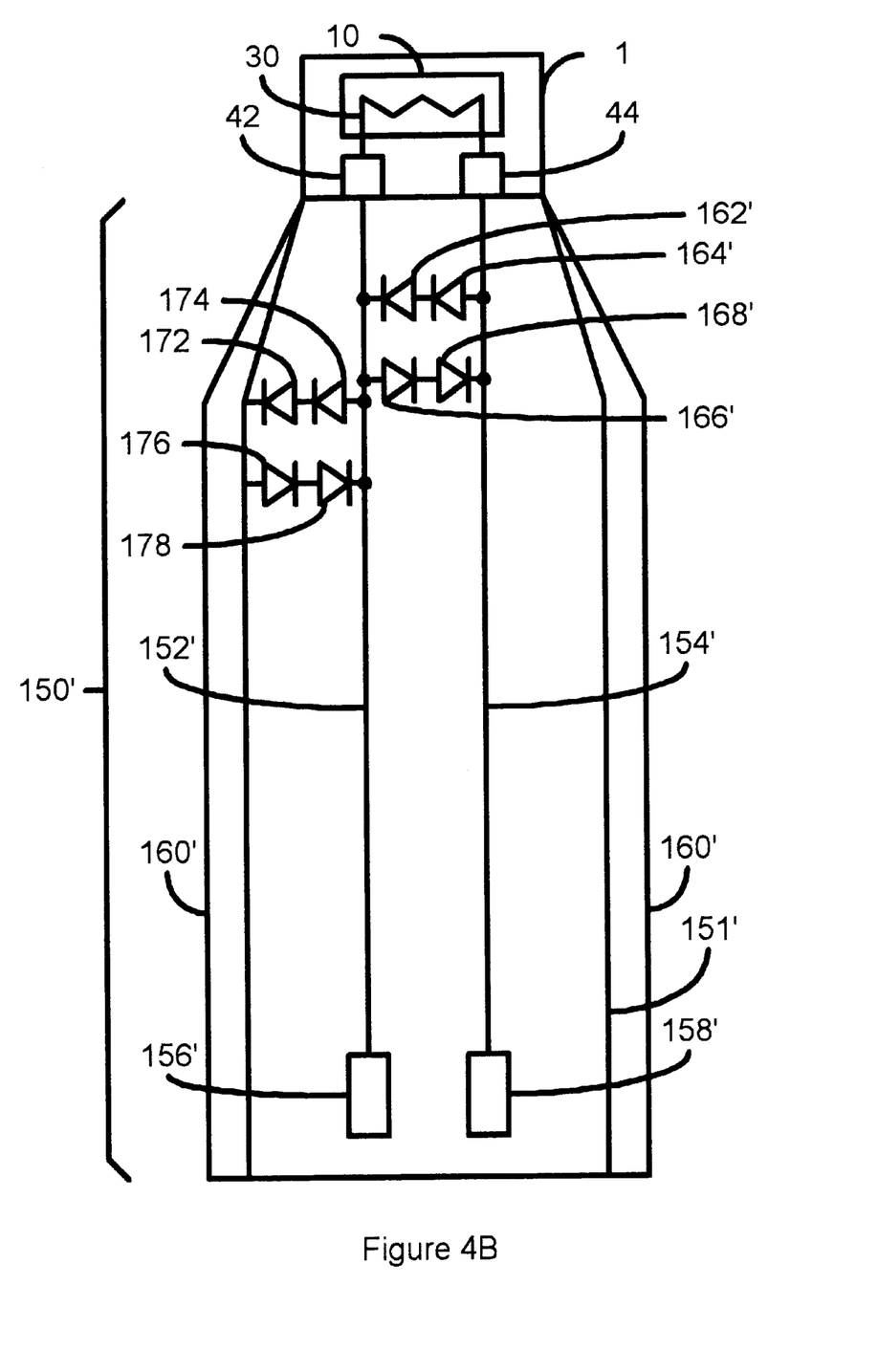
FIG. 4B is a diagram of another version of the third embodiment of a suspension assembly in accordance with the present invention.

FIG. 4B is a diagram of another version of the third embodiment of a suspension assembly 150' in accordance with the present invention. Many of the components of the suspension assembly 150' are the same as the suspension assembly 150. Consequently, many of the components of the suspension assembly 150' are labeled similarly to corresponding components of the suspension assembly 150. For example, the suspension assembly 150' includes diodes 162', 164', 166' and 168' that correspond to the diodes 162, 164, 166 and 168 of the suspension assembly 150. Thus, the suspension assembly 150' has many of the same benefits as the suspension assembly 150. Thus, the conductive strip 160' of suspension assembly 150' provides protection against ESD induced damage by virtue of providing a grounding plane coupled with the insulating layer 151' and reduces pickup of EM waves. The diodes 162', 164', 166' and 168' also protect against ESD induced damage by allowing current to flow between the lead 152' and the lead 154'. Thus, a tribo-charge on either of the leads 152' or 154' can be dissipated by transient current flow through the diodes 162', 164', 166' and 168', while limiting the flow of transient current through the MR sensor 30.

The suspension assembly 150' also includes diodes 172, 174, 176 and 178, which can electrically couple the lead 152' to the conductive strip 160'. Note that although only one conductive strip 160' is shown, multiple conductive strips could be used. The diodes 172, 174, 176 and 178 can electrically couple the lead 152' to the conductive strip 160'. The diodes 162', 164', 166', 168', 172, 174, 176 and 178 preferably have the same characteristics as the diodes 160, 162, 164 and 166 of FIG. 4A. Referring back to FIG. 4B, the diodes 162', 164', 166' and 168' and the diodes 172, 174, 176 and 178 are preferably coupled to the leads 152' and 154' at locations that are close to the MR sensor 30.

The diodes 162', 164', 166' and 168' and the diodes 172, 174, 176 and 178 each act as a clamp having a voltage equal to the threshold voltage (preferably approximately 0.7 volts each). As discussed above, the diodes 162', 164', 166' and 168' allow transient currents to flow between the leads 152' and 154', thereby allowing a charge on the leads 152' and 154' to be dissipated without a large current flowing through the MR sensor 30.

The conductive strip 160' acts as a local ground and, when actually grounded, a global ground. The diodes 172 and 174 and the diodes 176 and 178 electrically couple the lead 152' and local or global ground provided by the conductive strip 160'. As a result, current that would otherwise flow through the MR sensor 30 may flow through the diodes 172 and 174 or through the diodes 176 and 178 to ground. The current will flow through the diodes 172 and 174 and the diodes 176 and 178 if the voltage between the lead 152' and the conductive strip 160' is greater than the sum of the threshold voltages of the diodes 172 and 174 or the sum of the threshold voltages of the diodes 176 and 178, respectively. Thus, the diodes 172, 174, 176 and 178 provide another mechanism for dissipating charge by allowing a charge on the leads 152' and 154' to flow to ground. Note that a charge on the lead 154' may flow to ground not only through the diodes 172, 174, 176 and 178, but may also flow through the diodes 162', 164', 166' and 168'. Consequently, transient currents through the MR sensor 130 can be reduced or eliminated. These transient currents may be due to tribo-charging of the lead 152' or the lead 154'. Thus, the MR sensor 30 can be protected from ESD induced damage.

For example, the pad 156' or 158' may be touched during fabrication of the suspension assembly 150', inducing a large charge on the lead 152' or the lead 154', respectively. Instead of dissipating this charge through the MR sensor 30, at least a portion of the charge can dissipated by the flow of current between the lead 152' and the conductive strip 160', the flow of current between the lead 152' and the lead 154', and the flow of current from the lead 154' to the lead 152' and then to the conductive strip 160'. The conductive strip 160' thus acts as a (local or global) ground. Current can flow to the conductive strip 160' when the voltage difference between the lead 152' and the conductive strip 160' due to the charge on the lead 152' is at least the sum of the threshold voltages of the diodes 172 and 174 or the sum of the threshold voltages of the diodes 176 and 178. Similarly, current can flow when the voltage difference between the lead 152' and the lead 154' due to the charge on the lead 152' or 154' is at least the sum of the threshold voltages of the diodes 162' and 164' or the sum of the threshold voltages of the diodes 166' and 168'. The actual path of the current, through diodes 162' and 164', through diodes 166' and 168', through diodes 172 and 174 or through diodes 176 and 178, depends upon the sign of the charge on the lead 152' or 154'. Thus, a voltage of greater than or equal to the sum of the threshold voltages of the diodes 162' and 164', the sum of the threshold voltages of the diodes 166' and 168', the sum of the threshold voltages of the diodes 172 and 174, or the sum of the threshold voltages of the diodes 176 and 178 (e.g. 1.4 volts if each diode 162', 164', 166', 168', 172, 174, 176 and 178 has a threshold voltage of 0.7 volts) and that may be due to a tribo-charge can be dissipated through the diodes 162' and 164', the diodes 166' and 168', the diodes 172 and 174 or the diodes 176 and 178, respectively. Consequently, the MR sensor 30 can be protected from damage due to transient currents.

Figure 4C:
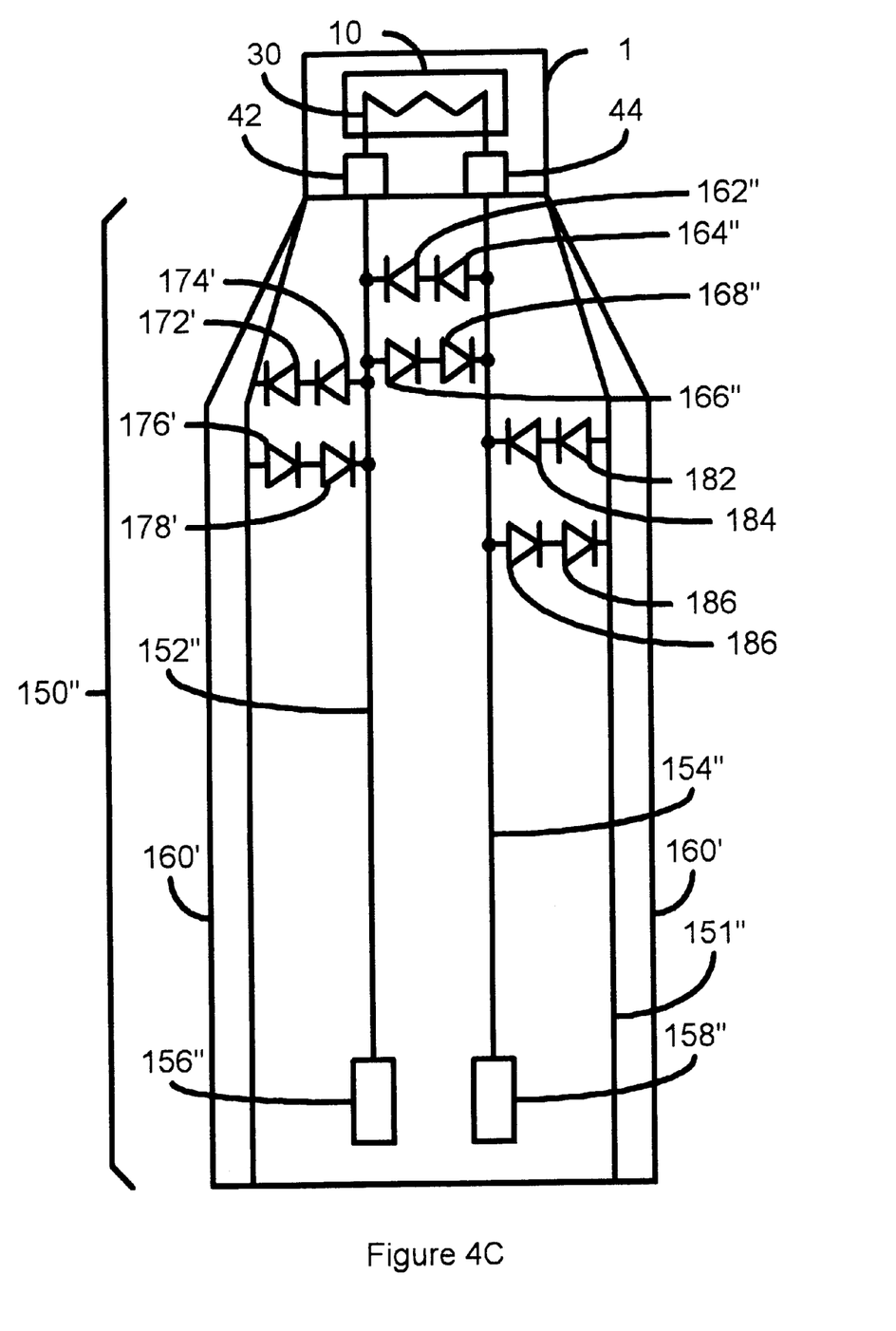
FIG. 4C is a diagram of another version of the third embodiment of a suspension assembly in accordance with the present invention.

FIG. 4C is a dia gram of another version of the third embodiment of a suspension assembly 150" in accordance with the present invention. Many of the components of the suspension assembly 150" are the same as the suspension assembly 150 and 150'. Consequently, many of the components of the suspension assembly 150" are labeled similarly to corresponding components of the suspension assembly 150'. For example, the suspension assembly 150" includes diodes 162", 164", 166" and 168" that correspond to the diodes 162', 164', 166' and 168' of the suspension assembly 150'. Thus, the suspension assembly 150" has many of the same benefits as the suspension assembly 150'. Thus, the conductive strip 160" of suspension assembly 150" provides protection against ESD induced damage by virtue of providing a grounding plane coupled with the insulating layer 151" and reduces pickup of EM waves. The diodes 162", 164", 166" and 168" also protect against ESD induced damage by allowing current to flow between the lead 152" and the lead 154". Thus, a tribo-charge on either of the leads 152" or 154" can be dissipated by transient current flow through the diodes 162", 164", 166" and 168", while limiting the flow of transient current through the MR sensor 30.

Similarly, the diodes 172', 174', 176' and 178' correspond to the diodes 172, 174, 176 and 178 of the suspension assembly 150'. Thus, the diodes 172', 174', 176' and 178' allow current to flow between the lead 152" and the conductive strip 160'. Thus, a tribo-charge on the leads 152" and 154" can be dissipated by transient current which allows the tribo-charge to flow to the local or global ground provided by the conductive strip 160'.

The suspension assembly 150" also includes diodes 182, 184, 186 and 188, which can electrically couple the lead 154" to the conductive strip 160". Note that although only one conductive strip 160" is shown, multiple conductive strips could be used. Similarly, although the diodes 182, 184, 186 and 188 are shown as coupled to the same conductive strip 160" as the diodes 172', 174', 176' and 178', the diodes 182, 184, 186 and 188 could be coupled to a different conductive strip. The diodes 162", 164", 166", 168", 172', 174', 176', 178', 182, 184, 186 and 188 preferably have the same characteristics as the diodes 160, 162, 164 and 166 of FIG. 4A. Referring back to FIG. 4C, the diodes 162", 164", 166" and 168", the diodes 172', 174', 176' and 178' and the diodes 182, 184, 186 and 188 are preferably coupled to the leads 152" and 154" at locations that are close to the MR sensor 30.

The diodes 182, 184, 186 and 188 function similarly to the diodes 172', 174', 176' and 178', except that the diodes 182, 184, 186 and 188 couple the lead 154" to the conductive strip 160". Thus, the diodes 182, 184, 186 and 188 couple the lead 154" to a local ground, allowing transient current to flow to ground under some conditions. In particular, the diodes 182 and 184 and the diodes 186 and 188 allow transient current to flow between the conductive strip 160" and the lead 154" when the voltage between the conductive strip 160" and the lead 154" exceeds the sum of threshold voltages of the diodes 182 and 184 or the sum of the threshold voltages of the diodes 186 and 188. When this occurs, a charge on the lead 154" can flow through the diodes 182 and 184 or the diodes 186 and 188 directly to the local or global ground provided by the conductive strip 160". Consequently, a tribo-charge induced on the leads 154" can be dissipated through the diodes 182, 184, 186 and 188 without generating a large transient current through the MR sensor 30. Protection against ESD induced damage to the MR sensor 30 is thus improved. Furthermore, as discussed above, transient currents can also flow between leads 152" and 154" and between the lead 152" and the conductive strip 160" without causing a large transient current to flow through the MR sensor 30. As a result, the MR sensor 30 is well protected against damage from ESD.

In the suspension assemblies 120, 120', 150, 150' and 150" the total voltage drops provided by the diodes used should be selected so that the total voltage drop provided by the diodes is far from the voltage across the MR sensor 30 during operation of the MR head 10. The voltage across the MR sensor 30 during operation depends upon the MR sensor 30 and the bias current used. For example, if the MR sensor 30 is a GMR sensor, the resistance of the MR sensor 30 is approximately forty to fifty ohms and the bias current generally used is approximately five milliamps. Thus, at steady state, the voltage drop across the MR sensor 30 is approximately 0.25 volts. However, if the MR sensor 30 is an AMR sensor, then the bias current typically used is approximately ten milliamps. Thus, the steady-state voltage drop across the MR sensor 30 is approximately 0.5 volts. It is desirable that the voltage drop provided by the diodes used in the suspension assemblies 120, 120', 150, 150' and 150" be much larger than the voltage drop across the MR sensor 30. As a result, little current will be shunted away from the MR sensor 30 during use. Thus, the presence of the diodes in the suspension assemblies 120, 120', 150, 150' and 150" will not significantly affect the performance of the MR sensor 30. ESD protection can thus be provided without adversely affecting performance of the MR sensor 30.

For example, refer to FIG. 4C. Suppose each of the diodes 162", 164", 166", 168", 172', 174', 176', 178', 182, 184, 186 and 188 each have a threshold voltage of approximately 0.7 volts. Because the diodes 162" and 164" are coupled such that their polarity is opposite to the polarities of the diodes 166" and 168", the diodes 162" and 164" and the diodes 166" and 168" provide voltage drops of 1.4 volts between the lead 152' and the lead 154". For similar reasons, the diodes 172' and 174' and the diodes 176' and 178' provide a voltage drop of 1.4 volts between the lead 152" and the conductive strip 160". Similarly, the diodes 182 and 184 and the diodes 186 and 188 provide a voltage drop of 1.4 volts between the lead 154" and the conductive strip 160". If the MR sensor 30 is a GMR. sensor as discussed above, the voltage drop across the MR sensor 30 is approximately 0.25 volts. Thus, the voltage drops between the leads 154" and 152", between the lead 152" and the conductive strip 160" and between the lead 154" and the conductive strip 160" is much larger than the voltage drop across the MR sensor 30. As a result, only approximately fifteen percent of the bias current provided to the MR sensor 30 may be diverted by the diodes 162", 164", 166", 168", 172', 174', 176', 178', 182, 184, 186 and 188. Thus, the diodes 162", 164", 166", 168", 172', 174', 176', 178', 182, 184, 186 and 188 may not adversely affect the performance of the MR sensor during use and can still provide ESD protection. However, if only a 0.7 volt drop was provided between the leads 152" and 154", between the lead 152" and the conductive strip 160" and between the lead 154" and the conductive strip 160", the voltage drop may be too close to that across the MR sensor 30. Thus, if each diode has a threshold voltage of 0.7 volts, then two diodes would be preferable to single diodes each having a voltage drop of 0.7 volts connected in opposite polarities between the leads 152" and 154", between the lead 152' and the conductive strip 160" and between the lead 154" and the conductive strip 160". Thus, the configuration shown in FIG. 4C would be preferred if the diodes 162", 164", 166", 168", 172', 174', 176', 178', 182, 184, 186 and 188 each have a threshold voltage of 0.7 volts. However, a total voltage drop of 0.7 volts between the leads 152" and 154", between the lead 152" and the conductive strip 160" and between the lead 154" and the conductive strip 160" may still provide ESD protection without too significant of a disruption in the operation of the MR sensor 30.

However, if the MR sensor 30 is an AMR sensor, the situation may be different. As discussed above, such an AMR sensor may have a voltage drop of approximately 0.5 volts. If the diodes 162", 164", 166", 168", 172', 174', 176', 178', 182, 184, 186 and 188 only provide a voltage drop of 0.7 volts between the leads 152" and 154", between the lead 152" and the conductive strip 160" and between the lead 154" and the conductive strip 160", then this voltage drop is very similar to the voltage drop across the MR sensor 30 during operation. Consequently, the diodes 162", 164", 166", 168", 172', 174', 176', 178', 182, 184, 186 and 188 may draw too much bias current from the MR sensor 30 and adversely affect the performance of the MR sensor 30. However, the diodes 162", 164", 166", 168", 172', 174', 176', 178', 182, 184, 186 and 188 may each have a threshold voltage of 0.7 volts. The voltage drop between the leads 152" and 154", between the lead 152" and the conductive strip 160" and between the lead 154" and the conductive strip 160" is then 1.4 volts. This voltage may be sufficiently far from the voltage drop across the MR sensor 30. However, a larger voltage drop may be desirable.

Figure 5:
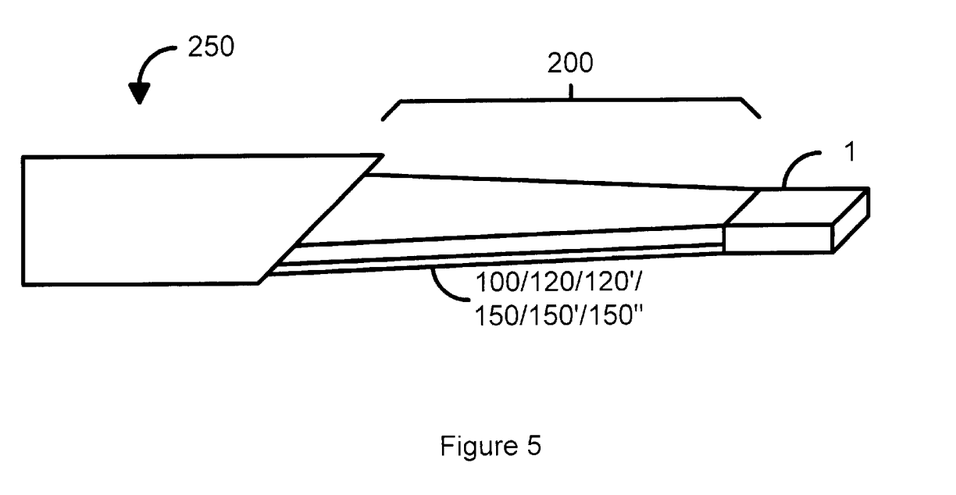
FIG. 5 depicts embodiments of a suspension assembly in accordance with the present invention as used in a magnetic recording system.

FIG. 5 depicts embodiments of a suspension assembly 100/120/120'/150/150'/150" in accordance with the present invention as used in a magnetic recording system. Shown is the slider 10, an HGA 200 and actuator arm assembly 250. The suspension assembly 100/120/120'/150/150'/150" resides along the HGA and is used to provide electrical connection between external circuits (not shown) and the head (not shown in FIG. 5) on the slider 1. The suspension assembly 100/120/120'/150/150'/150" is thus preferably a wireless suspension assembly, such as FOS, TSA, COS or in a BFC.

In general, MR sensors 30 which are less sensitive and used with lower areal density recording media have a higher voltage drop. Consequently, the combination of diodes used should generally provide a higher voltage drop between leads or between a lead and a conductive strip for such sensors. If all of the diodes used have the same characteristics, such as the same threshold voltage, this criterion corresponds to utilizing more diodes for less sensitive heads. However, the diodes also provide ESD protection. A larger number of diodes or a larger voltage drop between leads or between a lead and the conductive strip means that a larger charge will be required for the diodes to function in providing ESD protection. Consequently, when implementing the present invention, such as is shown in FIGS. 2A–4C, both the sensitivity of the MR sensor 30 and the ESD protection desired should be accounted for in determining the number and characteristics of the diodes to be used.

A method and system has been disclosed for a suspension assembly that allows an MR head to have greater resistance to ESD damage. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A suspension assembly for protecting a magnetoresistive (MR) head from electrostatic discharge damage, the MR head including an MR sensor having a first end and a second end, the suspension assembly comprising:

a first lead and a second lead, the MR head being coupled with the suspension assembly, the first end of the MR sensor being coupled with the first lead, the second lead being coupled with the second end of the MR sensor;

an insulating film substantially supporting a first portion of the first lead and a second portion of the second lead; and     a conductive strip coupled with the insulating film.

2. The suspension assembly of claim 1 wherein the first lead is electrically coupled with the conductive strip.

3. The suspension assembly of claim 2 further comprising:

at least one diode electrically coupling the first lead and the conductive strip.

4. The suspension assembly of claim 3 wherein the at least one diode further includes a first diode having a first polarity and a second diode having a second polarity, the first diode and the second diode being coupled in parallel between the first lead and the conductive strip such that the first polarity is opposite to the second polarity.

5. The suspension assembly of claim 2 wherein the second lead is electrically coupled with the conductive strip.

6. The suspension assembly of claim 5 further comprising:

at least a first diode electrically coupling the first lead and the conductive strip; and     at least a second diode electrically coupling the second lead and the conductive strip.

7. The suspension assembly of claim 6 wherein the at least the first diode further includes the first diode and a third diode, the at least the second diode further including the second diode and a fourth diode, the first diode having a first polarity, the second diode having a second polarity, the third diode having a third polarity and the fourth diode having a fourth polarity, the first diode and the third diode being coupled in parallel between the first lead and the conductive strip such that the first polarity is opposite to the third polarity, the second diode and the fourth diode being coupled in, parallel between the second lead and the conductive strip such that the second polarity is opposite to the fourth polarity.

8. The suspension assembly of claim 1 wherein the first lead is electrically coupled with the second lead.

9. The suspension assembly of claim 8 wherein the first lead and the second lead are coupled with at least one diode.

10. The suspension assembly of claim 9 wherein the at least one diode further includes a first diode having a first polarity and a second diode having a second polarity, the first diode and the second diode being coupled in parallel between the first lead and the second lead such that the first polarity is opposite to the second polarity.

11. The suspension assembly of claim 10 wherein the first lead is also electrically coupled to the conductive strip.

12. The suspension assembly of claim 11 further comprising:
   at least one diode electrically coupling the first lead and the conductive strip.

13. The suspension assembly of claim 12 further comprising:
   at least a second diode electrically coupling the second lead at the conductive strip.

14. The suspension assembly of claim 11 wherein the second lead is electrically coupled with the conductive strip.

15. A method for providing a suspension assembly for protecting a magnetoresistive (MR) head from electrostatic discharge damage, the MR head including an MR sensor having a first end and a second end, the method comprising the steps of:
   (a) providing a first lead and a second lead, the MR head being coupled with the suspension assembly, the first end of the MR sensor being coupled with the first lead, the second lead being coupled with the second end of the MR sensor;
   (b) providing an insulating film substantially supporting a first portion of the first lead and a second portion of the second lead; and
   (c) providing a conductive strip coupled with the insulating film.

16. The method of claim 15 further comprising the step of:
   (d) electrically coupling the first lead with the conductive strip.

17. The method of claim 16 wherein the electrically coupling step (d) further includes the step of:
   (d1) providing at least one diode to electrically couple the first lead and the conductive strip.

18. The method of claim 17 wherein the at least one diode further includes a first diode having a first polarity and a second diode having a second polarity, the first diode and the second diode being coupled in parallel between the first lead and the conductive strip such that the first polarity is opposite to the second polarity.

19. The method of claim 16 further comprising the step of:
   (e) electrically coupling the second lead with the conductive strip.

20. The method of claim 19 wherein the electrically coupling the first lead step (d) further includes the step of:
   (d1) providing at least a first diode electrically coupling the first lead and the conductive strip; and wherein the electrically coupling the second lead step (e) further includes the step of
   (e1) providing at least a second diode to electrically couple the second lead and the conductive strip.

21. The method of claim 20 wherein the at least the first diode further includes the first diode and a third diode, the at least the second diode further including the second diode and a fourth diode, the first diode having a first polarity, the second diode having a second polarity, the third diode having a third polarity and the fourth diode having a fourth polarity, the first diode and the third diode being coupled in parallel between the first lead and the conductive strip such that the first polarity is opposite to the third polarity, the second diode and the fourth diode being coupled in parallel between the second lead and the conductive strip such that the second polarity is opposite to the fourth polarity.

22. The method of claim 19 further comprising the step of:
   (d) electrically coupling the first lead with the second lead.

23. The method of claim 22 wherein the electrically coupling step (d) further includes the step of:
   (d1) electrically coupling first lead and the second lead with at least one diode.

24. The method of claim 23 wherein the at least one diode further includes a first diode having a first polarity and a second diode having a second polarity, the first diode and the second diode being coupled in parallel between the first lead and the second lead such that the first polarity is opposite to the second polarity.

25. The method of claim 24 further comprising the step of:
   (e) electrically coupling the first lead with the conductive strip.

26. The method of claim 25 wherein the electrically coupling step (e) further includes the step of:
   (e1) providing at least one diode to electrically couple the first lead and the conductive strip.

27. The method of claim 25 further comprising the step of:
   (f) electrically coupling the second lead with the conductive strip.

28. The method of claim 27 wherein the electrically coupling step (f) further includes the step of:
   (f1) using at least a second diode to electrically couple the second lead at the conductive strip.

* * * * *